US007161932B1

(12) United States Patent
Watts

(10) Patent No.: US 7,161,932 B1
(45) Date of Patent: Jan. 9, 2007

(54) APPARATUS, AND ASSOCIATED METHOD, FOR COMPLETING A CALL TO A PACKET-NETWORK, TELEPHONIC STATION

(75) Inventor: Ronald Franklin Watts, Lewisville, TX (US)

(73) Assignee: Alcatel, Paris (FR)

(*) Notice: Subject to any disclaimer, the term of this patent is extended or adjusted under 35 U.S.C. 154(b) by 978 days.

(21) Appl. No.: 10/023,576

(22) Filed: Dec. 14, 2001

(51) Int. Cl.
*H04L 12/66* (2006.01)

(52) U.S. Cl. .................................. 370/352; 370/395.2
(58) Field of Classification Search .......... 370/366, 370/536, 395.2, 352
See application file for complete search history.

(56) References Cited

U.S. PATENT DOCUMENTS

| 6,353,660 | B1 * | 3/2002 | Burger et al. ............ 379/88.17 |
| 6,600,733 | B1 * | 7/2003 | Deng ....................... 370/352 |
| 6,735,621 | B1 * | 5/2004 | Yoakum et al. ............ 709/218 |
| 6,778,656 | B1   | 8/2004 | Stevens et al. |
| 6,839,421 | B1 * | 1/2005 | Ferraro Esparza et al. ...... 379/220.01 |
| 2003/0002467 | A1 * | 1/2003 | Leung ....................... 370/338 |

FOREIGN PATENT DOCUMENTS

| WO | 01/10140 A1 | 2/2001 |
| WO | 02/11408 A2 | 2/2002 |

OTHER PUBLICATIONS

Salman M A et al: "The Future of IP-PSTN Interworking" 38th European Telecommunications Congress. Proceedings Networking the Future. Utrecht, NL, Aug. 24-28, 1999, London: IBTE, GB, Aug. 24, 1999 (Aug. 24, 1999), pp. 163-167, XP000847190.

* cited by examiner

*Primary Examiner*—Ricky Q. Ngo
*Assistant Examiner*—Richard Chang
(74) *Attorney, Agent, or Firm*—Bobby D. Slaton; V. Lawrence Sewell

(57) ABSTRACT

Apparatus, and an associated method, for facilitating a call to a packet-network, telephonic station, such as an SIP phone. The call is originated at a originating station formed of a telephonic station of a time-domain-multiplexing network. A call establishment creator is embodied at a media server forming a portion of the packet data network. A call, originated at the originating station, is routed to the call establishment creator. Once the call is routed thereto, an interactive session is formed between the media server and the originating station. During the interactive session, the information needed to ascertain the identity of the terminating station is ascertained, and the call is routed thereto.

15 Claims, 4 Drawing Sheets

APPARATUS, AND ASSOCIATED METHOD, FOR COMPLETING A CALL TO A PACKET-NETWORK, TELEPHONIC STATION

The present invention relates generally to a manner by which to effectuate telephonic communication with a packet-network, telephonic station, such as an SIP (session initiation protocol) phone, formed, e.g., at a personal computer workstation. More particularly, the present invention relates to apparatus, and an associated method, by which to permit a call, originated at a calling station of a time domain multiplexing network, to be routed to the packet-network, telephonic station. The call was originated at the calling station through entry thereat of a specified telephone number. The call origination causes a communication session to be formed between the calling station and an entity, such as a media server, of the packet data network. During the communication session, the identity of the packet-network, telephonic station is determined, and the call is routed thereto. The packet-network, telephonic station need not be uniquely identified by a telephone number normally used in the time domain multiplexing network. Instead, a packet-network identifier, such as an IP address, is used to identify the packet-network telephonic station.

BACKGROUND OF THE INVENTION

Telephonic communication through the use of telephonic communication systems is a necessary aspect of modern society. Telephonic networks of various telephonic communication systems have been installed throughout significant portions of the populated areas of the world.

Telephonic stations are connected to the telephonic network, such as by a wireline connection or a radio interface. A communication session is formed between two, or more, of the telephonic stations connected to a telephonic network. The telephonic station at which a call is originated is sometimes referred to as the calling party, and the telephonic station at which the call is to be completed, or terminated, is sometimes referred to as the called party.

In most conventional telephonic communication systems, circuit-switched connections are provided between endpoints, i.e., the calling and called parties, of a communication session. When a circuit-switched connection is formed, a dedicated channel is provided to permit the telephonic communications between the telephonic stations that form the endpoints of the communication sessions. For so long as the connection is maintained, telephonic communications between the calling and called parties are permitted. As the data to be communicated pursuant to the communication session might only be communicated intermittently, the communication capacity of the telephonic communication system is regularly, therefore, not fully utilized. Use of circuit-switched connections, as a result, inefficiently utilizes the communication capacity of a telephonic network.

Packet-switched communications, in contrast, are able more efficiently to utilize the communication capacity of a communication system. In a packet-based communication system, a common data path can be shared amongst two or more separate communication sessions. Because packet-formatted data can be communicated during discrete intervals, the same data path can be utilized to communicate packet-formatted data, during, e.g., separate time periods. More efficient utilization of the communication capacity of the communication system in which the packet-based communication scheme is implemented is thereby possible.

Various packet formatting protocols are used when forming, and sending, data packets formed of digital data bits. One protocol scheme, the Internet protocol (IP), or IP protocol, is regularly utilized in many different communication systems and communication applications. Communication devices and apparatus constructed to send, receive, transport, and operate upon IP-formatted data can be configured together in a communication system to provide for the communication of IP-formatted data.

The Internet is exemplary of a packet-based communication system. Data communicated by way of the Internet is formatted into packets and sent during discrete intervals. The packets, typically, are formatted pursuant to the IP protocol and include a header portion and a payload portion. The header portion contains the identity of the intended destination of the packet. An IP address identifies the destination of the packet. IP addresses are conventionally formatted pursuant to a standardized identification scheme, such as an IPv4 IPv6 identification scheme. Data packets that are to be communicated include in their header portions the IP addresses of the device to which the data packets are to be delivered.

Computer stations connected to conventional packet data networks, such as the Internet, are sometimes configured to permit telephonic communication to be effectuated therethrough. A call is routed through the packet data network, and the data that is communicated pursuant to a telephonic communication session can be formed of voice, as well as other, data. The computer station used as a telephonic endpoint forms a telephonic station.

When the other telephonic station with which the communication session is formed is operable in a conventional, circuit-switched telephonic system, the identity of the called party formed of the circuit-switched telephonic station is that which conventionally identifies the telephonic station in the circuit-switched system. More particularly, the telephonic station is identified pursuant to a specified numbering plan. The numbering plan used in North America, e.g., is the North America number plan. When the call is originated at the packet-network, telephonic station, the called party, formed of the circuit-switched, telephonic station, is easily identifiable by the telephone number associated therewith.

But, when instead, the call is initiated by a circuit-switched, telephonic station and the called party is formed of the packet-network, telephonic station, no correspondingly easy manner by which to identify the called party is available. Although the packet-network station is identified by its IP address, the address is not as readily entered by the calling party. That is to say, presently, no graceful manner is available by which to place a call to a packet-network, telephonic station from a circuit-switched telephonic station.

An improved manner by which to place a call to a packet-switched, telephonic station, such as an SIP phone, would therefore be advantageous.

It is in light of this background information related to telephonic communications with a packet-switched, telephonic station that the significant improvements of the present invention have evolved.

SUMMARY OF THE INVENTION

The present invention, accordingly, advantageously provides apparatus, and an associated method, by which to effectuate telephonic communication with a packet-network telephonic station, such as a SIP phone.

Through operation of an embodiment of the present invention, a manner is provided by which to permit a call, originated at a calling station operable in a time domain multiplexed network, to be routed to the packet-network, telephonic station.

A call is initiated, or otherwise originated, at the calling station through entry thereat of a specified telephone number. The call origination causes a communication session to be formed between the calling station and an entity, such as a media server, of the packet data network. During the communication session, the identity of the packet-network, telephonic station is determined and the call is routed thereto. The call is routed, for instance, by way of a media gateway that connects the time domain multiplexing network together with the packet network for delivery to the media server. An initial communication session is thereafter formed between the media server of the packet network and the calling station of the time domain network. Once the initial communication session is formed between the calling party and the media server, further identification of the identity of the called party is ascertained. The call is then routed to the packet-network telephonic station forming the called party. And, a communication session is formed between the calling party and the called party.

In one aspect of the present invention, the call originated at the calling party of the time domain multiplexing network is placed to a number identified by the number plan utilized in the time domain multiplexing network, such as a North American number plan. The number is, for instance, an 800 number, that utilizes a mnemonic identifier, e.g., 1-800-SIP-CALL. When the number is entered by the calling party, the time domain multiplexing network, to which the time domain multiplexing, telephonic station is coupled, routes the call to a media gateway that functions as a bridge interconnecting the time domain multiplexing network and the packet network. The media gateway to which the call is routed, in turn, inquires of an application server of the packet network to inquire of the identity of a media server to which to route the call. The identity of the media server is returned to the media gateway, the call is routed to the designated media server, and a communication session is formed between the calling party and the media server. Upon formation of the communication session therebetween, an interactive session is formed between the media server and the originating party formed of the calling party. During the interactive session therebetween, additional information is provided by the calling party to permit the identity of the called party to be ascertained.

In another aspect of the present invention, during the interactive session, the calling party enters values corresponding to the IP address of the packet-network telephonic station forming the called party. Upon delivery to the media server of the information, the call is routed to the called party.

In another aspect of the present invention, the media server includes a database at which IP addresses of packet-network, telephonic stations are indexed together with mnemonics associated therewith. During the interactive session between the media server and the calling party, the calling party enters a mnemonic associated with the called party. Upon delivery to the media server, the database is searched to learn the IP address associated with the mnemonic associated with the called party. When the IP address is ascertained, the call is routed to the called party to be terminated thereat. The mnemonic entered by the calling party comprises, for instance, the last name of the called party, a stored digit sequence, such as that used pursuant to speed-dialing operations, or other indicia, such as voice data that is transduced by a voice-to-data transducer located at the media server. A URL associated with the called party is, alternately, entered by the calling party. And, other types of indicia can also, of course, be utilized.

Because a call placed to the packet-network, telephonic station forming the called party is initiated through normal telephonic dialing by a time domain multiplexing, telephonic station, a straightforward manner by which to initiate a call to the packet-network telephonic station is provided.

In these and other aspects, therefore, apparatus, and an associated method, is provided for a telephone communication system having a packet data network and a time domain multiplexing network. Time-domain-multiplexing telephonic stations of the time domain multiplexing network are identified pursuant to a first selected numbering plan. And, packet-based telephonic stations of the packet data network are identified by an other-than-first-selected numbering plan. Placement of a call originated at an originating telephonic station of the time-domain-multiplexing telephonic station is facilitated. The call is for completion at a terminating telephonic station of the packet-based telephonic stations. A session establishment creator is positioned at the packet-based network and is coupled to receive indications of the originating telephonic station. The origination of the call is effectuated through entry of the originating telephonic station of a selected identification sequence defined pursuant to the first selected numbering plan. The session establishment creator creates a session permitting communication therefrom with the originating telephonic station and the text entry by the originating telephonic station of an identifier that identifies the termination station. The identifier used by the session establishment creator completes the call with the terminating telephonic station.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
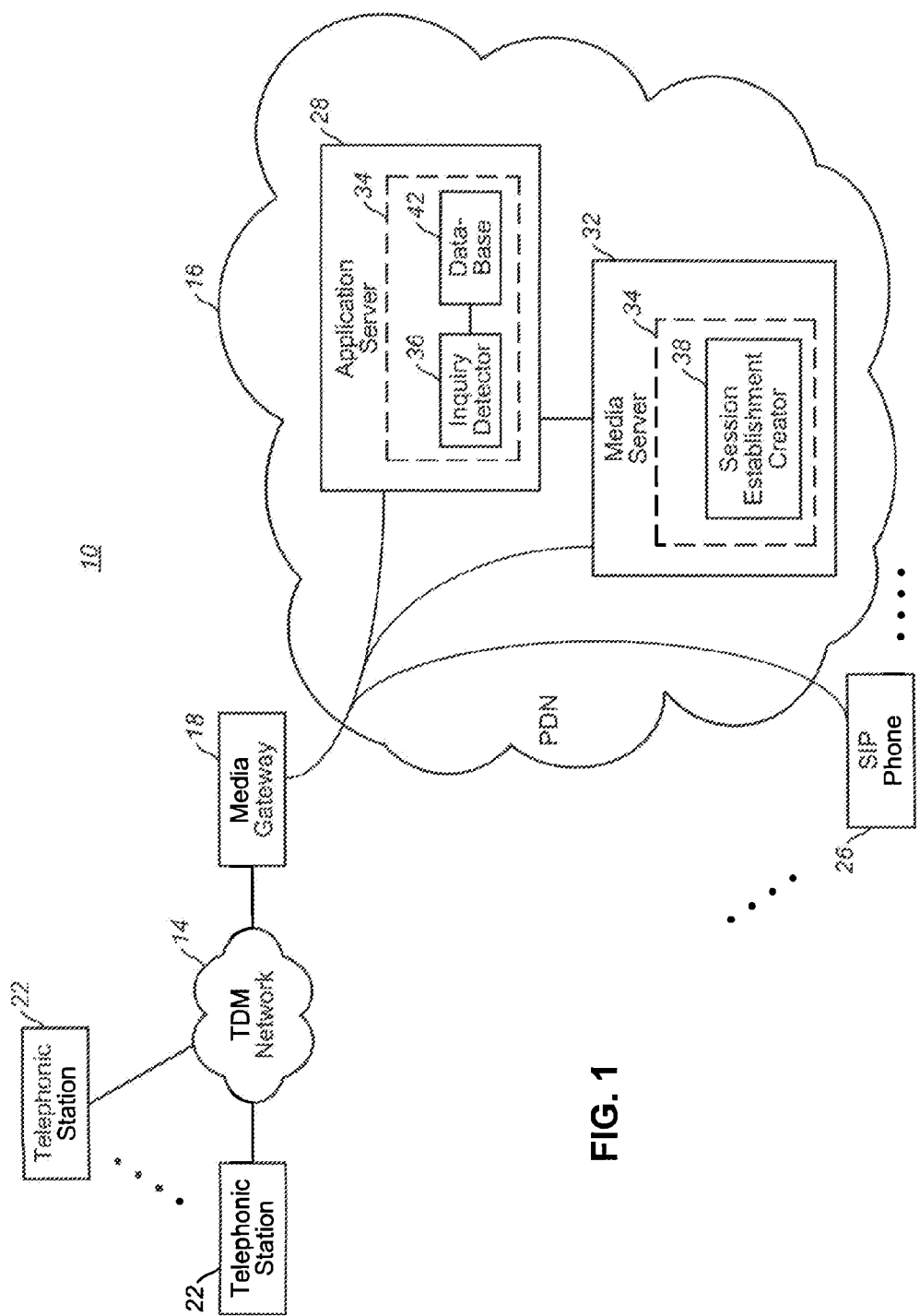
FIG. 1 illustrates a functional block diagram of a telephonic communication system in which an embodiment of the present invention is operable.

Referring first to FIG. 1, telephonic communication system, shown generally at 10, operates to provide for communications between communication stations, here telephonic stations, that are connected to, or otherwise operable in, the communication system. In the exemplary implementation, the telephonic communication system includes two separate network portions, a time domain multiplexing (TDM) network 14 and a packet data network (PDN)

network portion 16. The network portions 14 and 16 are interconnected by way of a media gateway 18 that operates as a bridge that interconnects the separate network portions. While, in the exemplary implementation, the packet data network forms the Internet backbone, the packet data network is also representative of other types of packet data networks, both public and private. Telephonic stations 22, connected to the TDM network 14, are favorable of originating telephone calls. The telephonic stations 22 are, for instance, POTS (plain old telephone service) telephones. More generally, the telephonic stations 22 are representative of any time-domain-multiplexing network telephonic stations. In conventional manner, the telephonic stations 22 are capable of originating calls to be completed with other telephonic stations connected to the TDM network. The TDM network generally is operable to provide circuit-switched connections between the calling party and called party of a call. The telephonic station from which a call is originated is referred to as the calling party, and the telephonic station at which the call is terminated is referred to as the called party.

Devices connected to the packet data network also include telephonic stations, here designated at 26, capable of telephonic communication. Telephonic stations 26 here form SIP (session interface protocol) phones. More generally, though, is representative of any packet-network, telephonic station. The telephonic stations 26 are formed, for instance, of computer workstations having appropriate software executable thereat to form a telephonic station capable of communicating telephonically by way of the packet data network 16. Commercially-available systems are available to permit a user of a workstation forming an SIP phone, or other packet-network telephonic station, to originate a call therefrom. The telephonic station 26, when forming a calling party, is able readily to originate a call to a called party formed of a telephonic station 22 of the TDM network 14. As the telephonic stations 22 are identified by a telephone number, such as a telephone number designated pursuant to the North American number plan, ready identification of the called party can be entered by a user of the calling party 26 from which a call is originated. That is, initiation of a call originated at a SIP phone is made by entering the telephone number associated with a called party formed of a TDM-network telephonic station 22. Because the TDM-network telephonic stations are readily identifiable by their respective telephone numbers, such call origination is easily implemented.

However, calls originated by a calling party for termination at a SIP phone 26 are not so easily initiated. Packet-network, telephonic stations are effectively unable to be identified by the same numbering plan by which the POTS phones 22 of the TDM network are identified. While the telephonic stations 26 of the packet data network, as well as other devices of the packet data network, are identified by IP (Internet protocol) addresses, conventional POTS phones 22, or other TDM-network telephonic stations, are conventionally unable conveniently to place a call to a SIP phone.

The packet data network 16 is here shown to include an application server 28 and a media server 32. Apparatus 34 of an embodiment of the present invention forms portions of the application server and media server 28 and 32, respectively. The apparatus 34 is functionally represented and can be implemented in any desired manner, such as by algorithms executable by appropriate processing circuitry. The apparatus 34 operates to facilitate routing of a call originated by a calling party, such as a telephonic station 22, to a called party formed of a selected packet-network telephonic station 26. When operated, the apparatus 34 permits a call originated by a calling party to initiate a call to a called party by entering a telephone number recognized by the number plan used by the TDM network to which the originating party formed of a telephonic station 22 is connected.

The number entered at the originating station is a number associated with telephonic stations connected to the packet data network. When the telephone number is entered pursuant to initiate a call to a telephonic station 26 of the packet data network, the call is routed to the media gateway 18. The media gateway, upon detection of placement of the call, inquires of the application server 28 for instructions as to how to route the call. The inquiry generated by the media gateway is provided to an inquiry detector 36 forming a portion of the apparatus 34 positioned at the application server. The detector operates to detect the inquiry generated by the media gateway responsive to origination of the call by the calling party 22. Responsive to the detection of the inquiry at the detector 36, a determination is made of the identity of a port of a media server, here the media server 32, that shall support the completion of the call to a designated SIP, or other packet-network, phone. A determination is made of the available port of the media server and provides the determined information to the media gateway. The media gateway then routes the call to the port of the media server. The apparatus 34 of the media server includes a session establishment creator 38. The session establishment creator operates to create an interactive session between the media server and the calling party. Namely, the media gateway upon instructions of the application server 28, routes the call to the designated media server, and the session establishment creator thereat creates the interactive session with the calling party. When the interactive session is formed, the caller that operates the originating telephonic station enters additional information that identifies the called party.

In one implementation, the calling party enters values corresponding to the IP address of the called party, such as by way of appropriate actuation of the telephonic keypad of the originating station. Suitable delimiters, such as the star key and the pound key, can be used to input periods separating parts of the IP address and to indicate completion of an entry and another suitable character input, such as a double star, can be used to erase a character.

In another implementation, the apparatus further includes a database 42 in which IP addresses of the SIP, or other packet-network, phones are indexed together with mnemonics associated therewith. In this embodiment, the caller utilizing the originating telephonic station to place the call inputs indicia associated with a mnemonic that identifies the telephonic station forming the called party. The mnemonic entered by the caller is, for instance, the last name of the called party and an associated keyword, registered by the user of the SIP phone. Additional information might be required to be entered by the caller that operates the originating station, such as a first name associated with the called party or a city associated with the called party.

In a further implementation, speed-dialing services are used and, during the interactive session between the originating station and the media server, entry of a speed-dial number causes transmission by the calling station of a lengthy sequence of digits, such as a URL of the called party or any other type of mnemonic indicia, or IP address of the called party. And, a voice recognition procedure is utilized in a further embodiment of the present invention. The user of the originating station enters, verbally, the additional indicia, and apparatus at the call establishment creator converts the voice information into a database inquiry to inquire of the IP address indexed together with the entered, mnemonic information.

Once the IP address of the called party is determined, either by direct entry thereof at the calling station or determination of the IP address of the called party through access to the database, the call is routed to the called party.

Figure 2:
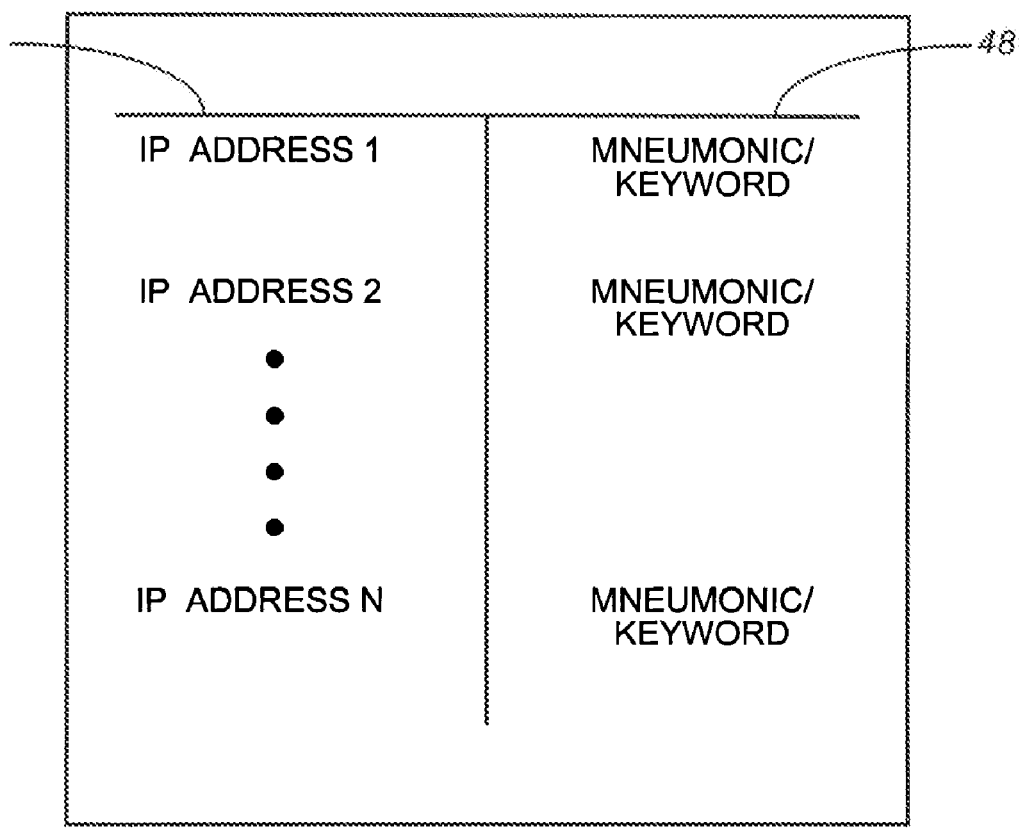
FIG. 2 illustrates a functional representation of a database used pursuant to operation of an embodiment of the present invention by which to route a call to a SIP phone, or other packet-network telephonic station of the communication system shown in FIG. 1.

FIG. 2 illustrates again the database 42 forming a portion of the apparatus 34 (shown in FIG. 1) of an embodiment of the present invention. Here, the database is shown to include a listing of IP addresses of packet-network telephonic stations, here indicated in the column 46. Indexed together with the IP addresses are mnemonic indicators, listed in the column 48. And, keywords associated with the IP addresses identifying the packet-network telephonic stations. The keywords are entered by users of the packet-network telephonic stations and are used for registration purposes. In an implementation in which mnemonics are entered by a user of the originating station pursuant to an interactive session between the originating station and the media server, the database is accessed to index the IP address associated with the entered mnemonic. The accessed IP address is then to route the call to the called party.

Figure 3:
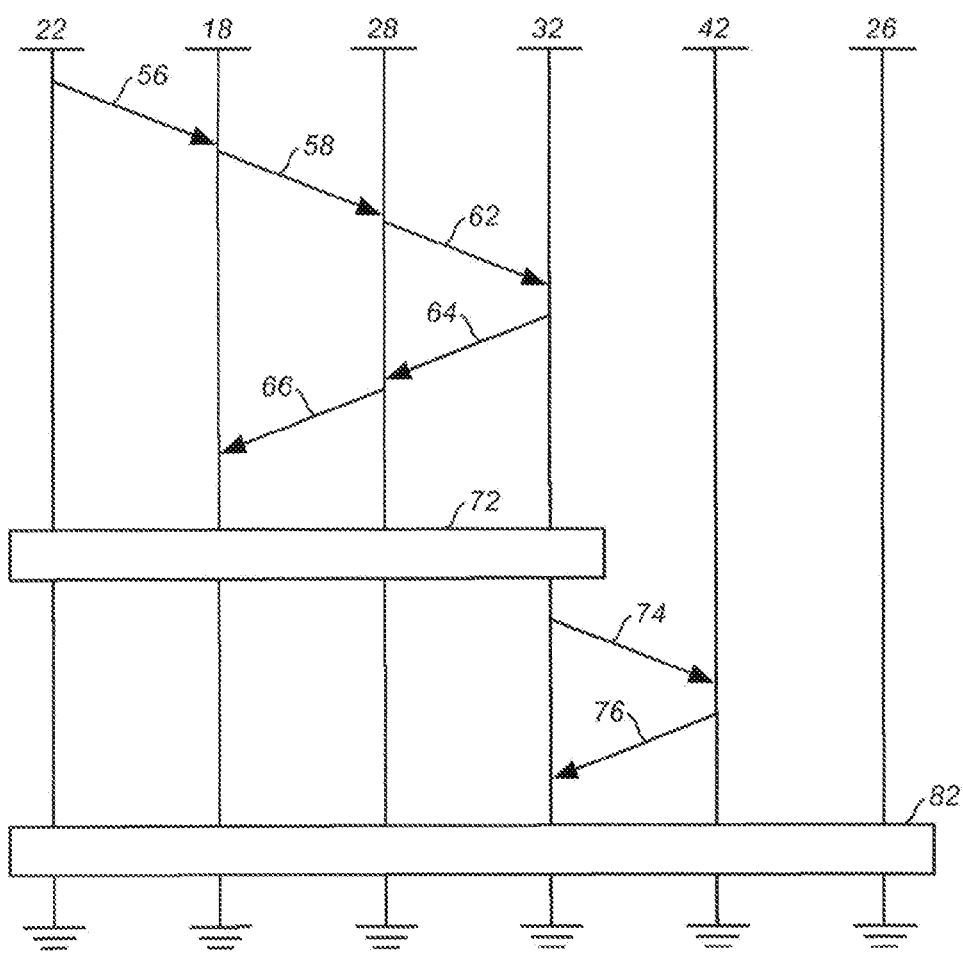
FIG. 3 illustrates a message sequence diagram illustrating the messages generated during operation of an embodiment of the present invention by which to route a call originated at a time domain multiplexing telephonic station to a SIP phone, or other packet-network telephonic station.

FIG. 3 illustrates a message sequence diagram, shown generally at 54, representative of signaling generated to route a call originated at a TDM-network telephonic station for termination at a selected packet-network telephonic station. The originating station 22 forms the calling party, and the telephonic station 26 forms the called party.

When the call is originated, the caller of the originating station 22 enters dialing digits, such as 1-800-SIP-CALL, or other number, to initiate the call. The call is routed, indicated by the segment 56, to the media gateway 18. Upon delivery to the media gateway 18, the media gateway inquires of the application server 28 for instructions as to routing of the call. The inquiry is indicated by the segment 58.

Responsive thereto, the application server 28 inquires of a media server 32 of the identity of a port of the media server 32 available for the call. The segment 62 is representative of the inquiry, and the segment 64 is representative of the response to the request. In one implementation, the application server 28 includes a database 42 that identifies the media server from amongst media servers 32 to which the call can be routed. And, in another implementation, the media server 32 is programmed to support the call placement application, and the call placement application only, on specific incoming ports thereof. The media gateway 18, in such an implementation, need not communicate with the application server 28, but can, instead, route the call immediately to the media server 32. The identity of the port of the media server 32 is here provided, indicated by the segment 66, to the media gateway 1, and, responsive thereto, and an interactive communication session, indicated by the block 72, is created. During the interactive session, additional information is provided by the originating station 22 to the media server 32, and the database 42 is accessed, indicated by the segment 74, if appropriate, and data is retrieved therefrom, indicated by the segment 76. When the IP address of the called party is identified, the call is routed thereto, and a communication session, indicated by the block 82, is formed between the calling party and the called party formed of the telephonic stations 22 and 26, respectively. Thereby, a call is established therebetween.

Figure 4:
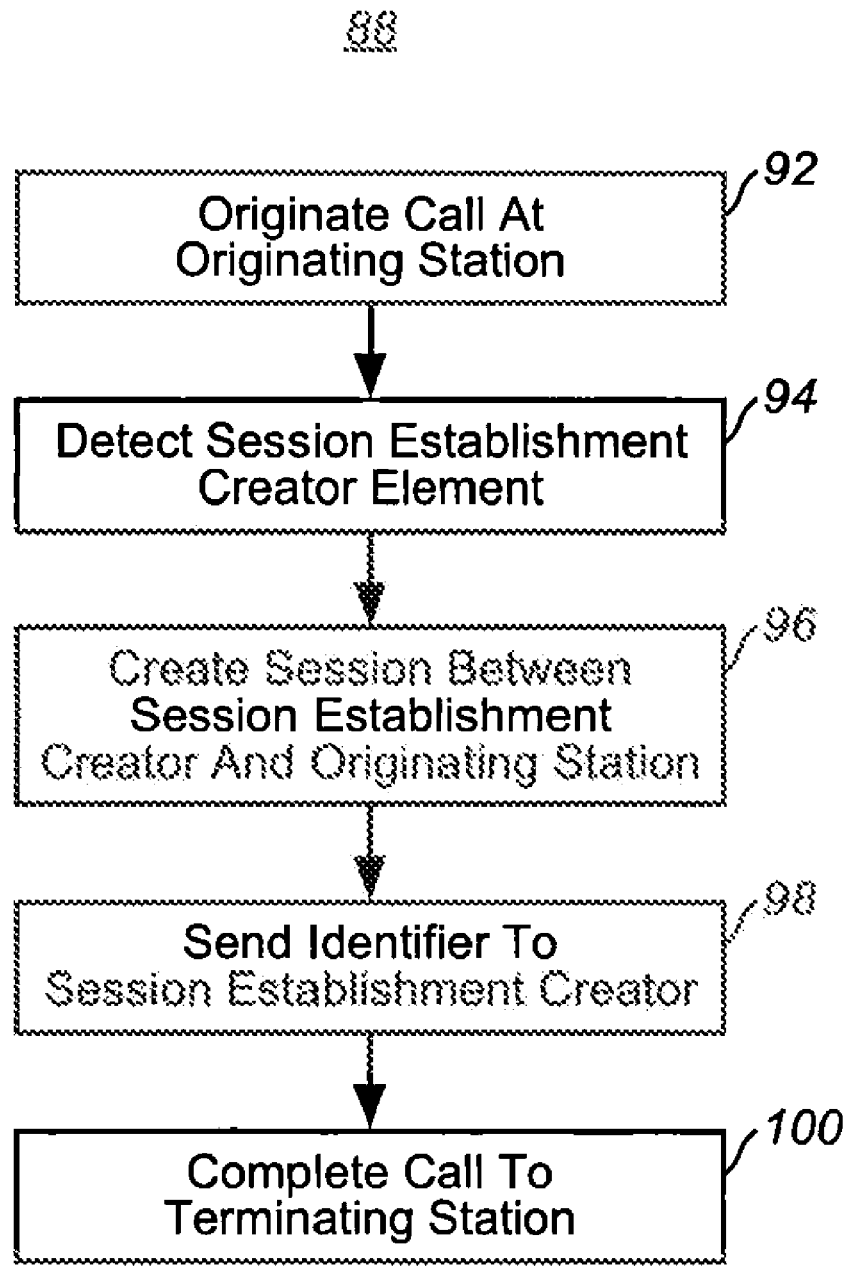
FIG. 4 illustrates a method flow diagram listing the method of operation of an embodiment of the present invention.

FIG. 4 illustrates a method flow diagram, shown generally at 88, of an embodiment of the present invention. The method is for facilitating placement of a call originated at an originating telephonic station of a time-domain-multiplexing telephonic network for completion at a terminating telephonic station of a packet data network.

First, and as indicated by the block 92, the call is originated at the originating station. Origination of the call is initiated through entry at the originating station of a selected identification sequence defined pursuant to a selected numbering plan.

Then, and as indicated by the block 94, a session establishment creator element positioned at the packet-network is detected. Then, and as indicated by the block 96, a session between the session establishment creator element and the originating telephonic station is created. Then, and as indicated by the block 98, an identifier is sent from the originating telephonic station to the session establishment creator. The identifier identifies the terminating station. Thereafter, and as indicated by the block 100, the call is completed to the terminating station.

Thereby, a manner is provided by which to permit origination of a call at a calling station of a TDM network to be terminated at a telephonic station of a packet data network.

The previous descriptions are of preferred examples for implementing the invention, and the scope of the invention should not necessarily be limited by this description. The scope of the present invention is defined by the following claims:

The invention claimed is:

1. In a telephone communication system having a packet-data network and a time domain multiplexing network, time-domain-multiplexing telephonic stations of the time domain multiplexing network identified pursuant to a first selected numbering plan and packet-based telephonic stations of the packet data network identified by an other-than-first-selected numbering plan, an improvement of an assembly for facilitating placement of a call originated at an originating telephonic station of the time-domain-multiplexing telephonic station for completion at a terminating telephonic station of the packet-based telephonic stations, said assembly comprising:

a session establishment creator positioned at the packet-based network and coupled to receive indications of originating telephonic station, the origination of the call effectuated through entry at the originating telephonic station of a selected identification sequence defined pursuant to the first selected numbering plan, said session establishment creator for creating a session permitting communication therefrom with the originating telephonic station and for detecting entry by the originating telephonic station of an identifier that identifies the termination station, the identifier used by said session establishment creator to complete the call with the terminating telephonic station;

media gateway positioned to interconnect the packet-based telephonic network and the time domain multiplexing network and wherein indications of the call originated at the originating telephonic station are provided by the media gateway to said session establishment creator, wherein the media gateway is identified by an identifier conforming to the first selected numbering plan and wherein the indications of the origination of the call are provided to said session establishment creator subsequent to delivery of the call origination at the media gateway; and an index database in which an IP address associated with the terminating telephonic station is indexed together with a mnemonic associated therewith and wherein the identifier entered by the originating telephonic station comprises representation of the mnemonic.

2. The apparatus of claim 1 further comprising a detector positioned at the packet-based network, said detector for detecting the origination of the call by the originating telephonic station and wherein the indications of the origination of the call to which said session establishment creator is coupled to receive are formed by said detector.

3. The apparatus of claim 2 wherein the packet-based network comprises an application server and wherein said detector is embodied at the application server.

4. The apparatus of claim 3 wherein the packet-based network further comprises at least a first media server and wherein said session establishment creator is embodied at the at least the first media server.

5. The apparatus of claim 4 wherein the at least the first media server comprises the first media server and at least a second media server, and wherein said session establishment creator is embodied at a selected one of the first and at least second media servers.

6. The apparatus of claim 5 wherein said detector embodied at the application server is further for selecting at which of the first and at least second media servers that the session establishment creator is to be embodied.

7. The apparatus of claim 2 wherein the communication system comprises a media gateway positioned to interconnect the packet-based telephonic network and the time domain multiplexing network and wherein the call originated at the originating telephonic station is routed to said detector by way of the media gateway.

8. The apparatus of claim 1 wherein the packet-based telephonic network comprises an IP network that utilizes IP protocol nomenclature and wherein the identifier entered by the originating telephonic station subsequent to creation of the session between said session establishment creator and the originating telephonic station comprises an IP address associated with the terminating telephonic station.

9. The apparatus of claim 1 wherein said session establishment creator causes the index database to be searched to locate the IP address associated with the mnemonic of which the representation thereof is received by said session establishment creator during the session formed with the originating telephonic station.

10. The apparatus of claim 9 wherein said session establishment creator further comprises a voice-to-text converter, wherein the entry by the originating telephonic station of the identifier comprises a voice entry and wherein said session establishment creator searches the index database subsequent to conversion of the voice entry into text form.

11. The apparatus of claim 1 wherein a user identity is associated with the terminating telephonic station and wherein the mnemonic is imitative of the user identity.

12. In a method for communicating in a telephonic communication system having a packet-data network and a time domain multiplexing network, time-domain-multiplexing telephonic stations of the time domain multiplexing network identified pursuant to a first selected numbering plan and packet-based telephonic stations of the packet data network identified by an other-than-first-selected numbering plan, an improvement of a method for facilitating placement of a call originated at an originating telephonic station of the time-domain-multiplexing telephonic station for completion at a terminating telephonic station of the packet-based telephonic stations, said method comprising:

originating the call at the originating telephonic station through entry thereat of a selected identification sequence defined pursuant to the first selected numbering plan;

detecting at a session establishment creator element positioned at the packet-based network, indications representative of the selected identification sequence;

creating a session between the session establishment creator element and the originating telephonic station;

sending an identifier from the originating telephonic station to the session establishment creator, the identifier identifying the terminating station, wherein the identifier is representative of an IP address identifying the terminating telephonic station;

maintaining a database accessible by the session establishment creator, the database including the IP address indexed together with a mnemonic associated with the terminating telephonic station; and completing the call to the terminating station.

13. The method of claim 12 wherein the identification sequence defined pursuant to the first selected numbering plan during said operation of originating comprises a number formatted pursuant to a North American Numbering Plan.

14. The method of claim 12 wherein the communication system further comprises a media gateway interconnecting the packet-based network and the time domain multiplexing network, said method further comprising the operation of routing the call originated during said operation through the media gateway.

15. The method of claim 12 wherein the identifier sent during said operation of sending comprises the mnemonic associated with the terminating telephonic station.

\* \* \* \* \*